US012753010B2

(12) United States Patent
Stoddard et al.

(10) Patent No.: US 12,753,010 B2
(45) Date of Patent: Oct. 6, 2026

(54) CONTAINER UNLOADING APPARATUS

(71) Applicant: Southworth International Group, Inc., Falmouth, ME (US)

(72) Inventors: Scott Stoddard, Gorham, ME (US); Emmanuel Marsh-Sachs, Sidney, ME (US); Jonathan Graeme Robertson, Biddeford, ME (US)

(73) Assignee: Southworth International Group, Inc., Falmouth, ME (US)

( * ) Notice: Subject to any disclaimer, the term of this patent is extended or adjusted under 35 U.S.C. 154(b) by 0 days.

(21) Appl. No.: 19/072,466

(22) Filed: Mar. 6, 2025

(65) Prior Publication Data

US 2025/0282552 A1 Sep. 11, 2025

Related U.S. Application Data

(60) Provisional application No. 63/562,349, filed on Mar. 7, 2024, provisional application No. 63/648,873, filed on May 17, 2024.

(51) Int. Cl.
*B65G 7/08* (2006.01)
*B65D 88/56* (2006.01)

(52) U.S. Cl.
CPC ................ *B65G 7/08* (2013.01); *B65D 88/56* (2013.01); *B65G 2201/0235* (2013.01)

(58) Field of Classification Search
CPC .. B65G 7/08; B65G 65/23; B65G 2814/0317; B65G 67/46; B65G 67/30; B65D 88/56; B65F 3/08; B65F 1/122; A61G 5/104
(Continued)

(56) References Cited

U.S. PATENT DOCUMENTS

| | | | | |
|---|---|---|---|---|
| 4,215,968 A * | 8/1980 | Rymer | .................. | B65G 65/23 414/421 |
| 4,422,814 A * | 12/1983 | Borders | .................. | B65F 3/043 414/303 |

(Continued)

FOREIGN PATENT DOCUMENTS

| | | | | |
|---|---|---|---|---|
| CN | 105502012 A * | 4/2016 | ............. | B65G 65/23 |
| DE | 2901260 A * | 7/1980 | ............. | B65G 65/24 |

(Continued)

OTHER PUBLICATIONS

PCT Search Report and Written Opinion mailed Apr. 29, 2025, received in corresponding PCT Application No. PCT/US25/18718, 11 pages.

*Primary Examiner* — Gregory W Adams
(74) *Attorney, Agent, or Firm* — Secant IP, PLLC

(57) ABSTRACT

An apparatus for emptying the contents of a container. The apparatus may include a base, a frame, and a vertical lift. The lift may include a drive portion fixed to the base and a linearly movable member pivotally coupled to the frame. The drive portion may be configured for driving the linearly movable member for movement relative to the base along a substantially linear axis. The lift may also include a pivot arm having a first end coupled to the base and a second end pivotally coupled to the frame. As the drive portion drives the linearly movable member along the substantially linear axis the frame moves upwardly and rotates relative to the base. The apparatus may include a base and a frame including an extension frame slidably movable between a non-extended position and an extended position. The apparatus may also include a conveyor disposed adjacent the extension frame.

26 Claims, 13 Drawing Sheets

(58) Field of Classification Search

USPC ....... 414/425, 546, 639, 409, 419, 421, 422, 414/642

See application file for complete search history.

(56) References Cited

U.S. PATENT DOCUMENTS

| | | | | | |
|---|---|---|---|---|---|
| 4,941,799 | A * | 7/1990 | Gordon | A61G 5/104 414/921 |
| 4,989,917 | A * | 2/1991 | Schmidt, Jr. | B60P 1/34 414/421 |
| 5,302,073 | A | 4/1994 | Riemersma et al. | |
| 6,390,750 | B1 * | 5/2002 | Niewohner | B65G 65/23 119/51.01 |
| 6,551,046 | B1 * | 4/2003 | Dorrington | B65F 3/08 414/408 |
| 6,565,308 | B2 * | 5/2003 | Derby | B65G 65/23 414/811 |
| 6,769,857 | B2 * | 8/2004 | Nyhof | B65G 65/23 414/421 |
| 6,884,017 | B2 * | 4/2005 | Arrez | B65F 3/046 414/408 |
| 7,018,155 | B1 | 3/2006 | Heberling et al. | |
| 8,764,372 | B2 * | 7/2014 | Fletcher | A61G 5/104 254/3 R |
| 2022/0242684 | A1 * | 8/2022 | Latvys | B66F 9/04 |

FOREIGN PATENT DOCUMENTS

| | | | | | |
|---|---|---|---|---|---|
| EP | 2067720 | A1 * | 6/2009 | B65F 1/1615 |
| FI | 20185949 | A1 | 5/2020 | |
| KR | 20210023651 | A * | 3/2021 | B65G 47/18 |
| NL | 8802239 | A * | 4/1990 | B62B 3/08 |
| WO | 2018206028 | A1 | 11/2018 | |

* cited by examiner

CONTAINER UNLOADING APPARATUS

CROSS-REFERENCE TO RELATED APPLICATIONS

The present application claims the benefit of the filing date of U.S. Provisional Application Ser. No. 63/562,349, filed Mar. 7, 2024, and U.S. Provisional Application Ser. No. 63/648,873, filed May 17, 2024, the teachings of which applications are hereby incorporated herein in their entirety.

TECHNICAL FIELD

The technical field relates to management of containers and, more specifically, to a container unloading apparatus with a vertical lift.

BACKGROUND INFORMATION

Containers are often used in industrial applications to manage large amounts of inventory. These containers are often filled with like pieces such as, for example, manufactured parts, raw materials, mail, goods, etc. Because these containers are heavy and unwieldy, loaders and unloaders are often specialized to facilitate loading and unloading of the containers. One concern with a container loader/unloader is the physical space it occupies when in an unloading position.

BRIEF DESCRIPTION OF THE DRAWINGS

Objects, features, and advantages disclosed herein will be apparent from the following description of particular embodiments, as illustrated in the accompanying drawings in which like reference characters/descriptions refer to the same parts throughout the different views. The drawings are not necessarily to scale, emphasis instead being placed upon illustrating the principles disclosed herein. For purposes of clarity, not every component may be labeled in every drawing.

DETAILED DESCRIPTION

Figure 1A:
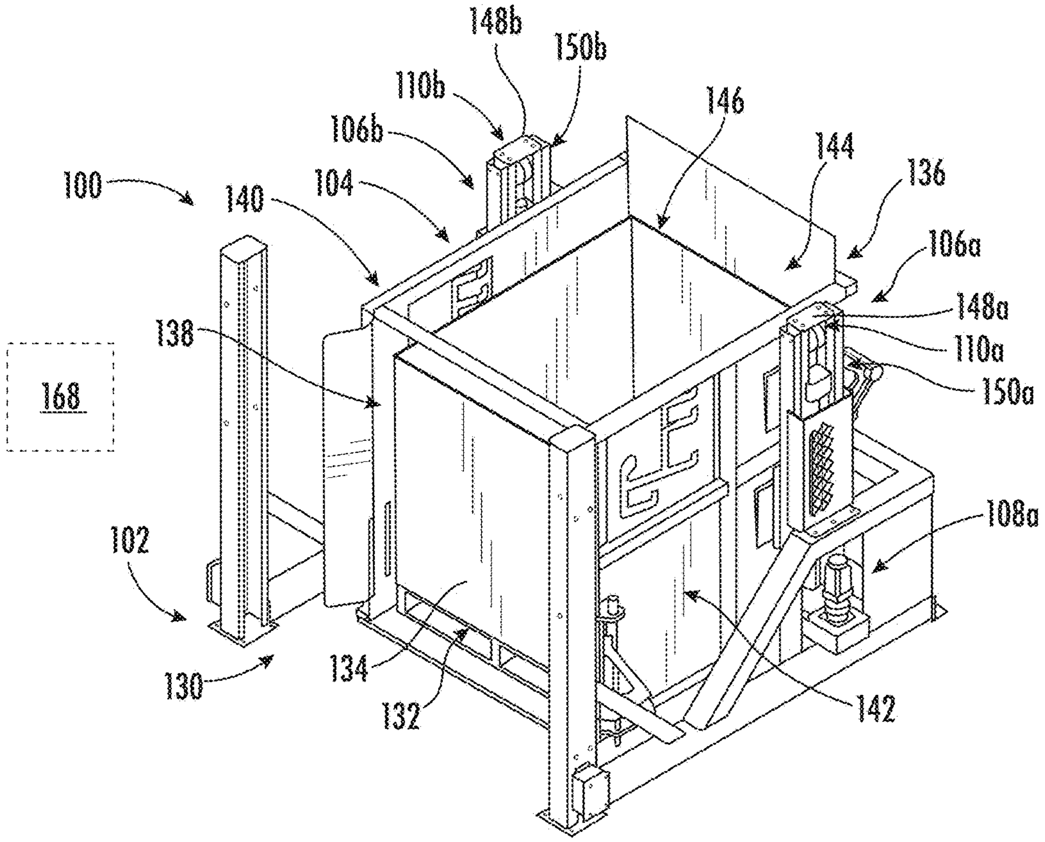
FIG. 1A is a right rear isometric view of one example embodiment of a container unloading apparatus consistent with the present disclosure wherein the apparatus is in a loading position.
Figure 1B:
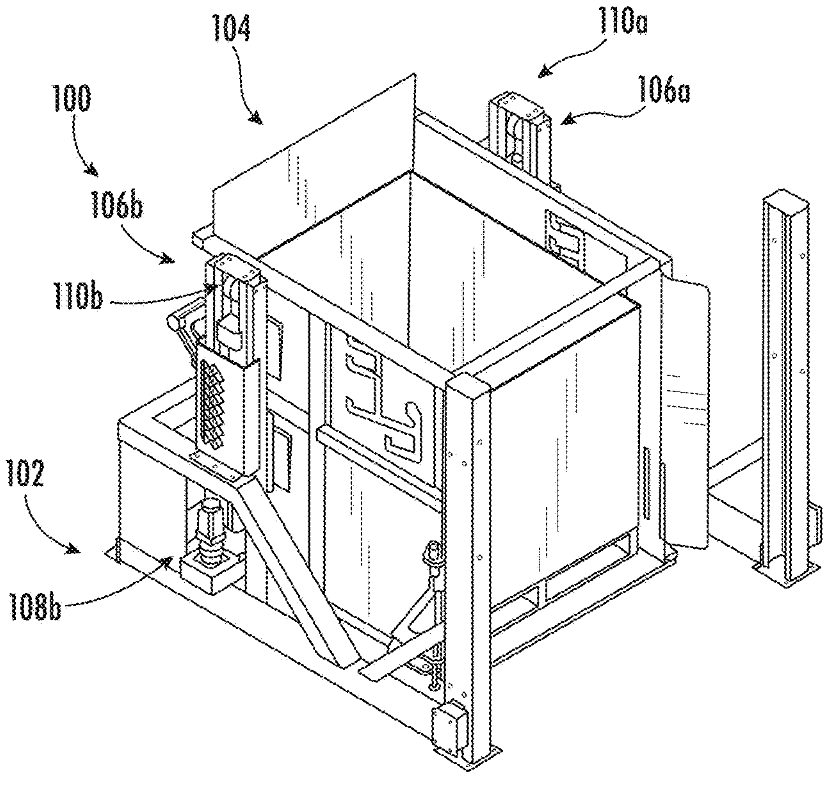
FIG. 1B is a left rear isometric side view of the container unloading apparatus shown in FIG. 1A.
Figure 1C:
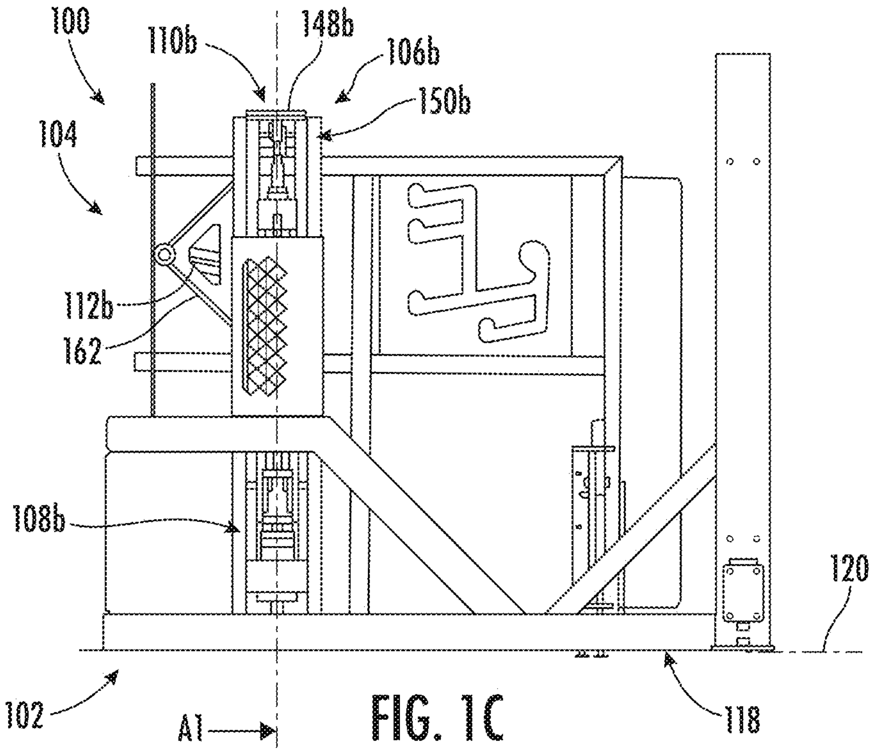
FIG. 1C is a left side view of the container unloading apparatus shown in FIG. 1A.

The present disclosure is not limited in its application to the details of construction and the arrangement of components set forth in the following description or illustrated in the drawings. The examples described herein may be capable of other embodiments and of being practiced or being carried out in various ways. Also, the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

An apparatus for emptying the contents of a container consistent with embodiments of the present disclosure may include a base, a frame, and a vertical lift. The lift may include a drive portion fixed to the base and a linearly movable member pivotally coupled to the frame. The drive portion may be configured for driving the linearly movable member for movement relative to the drive portion and the base along a substantially linear axis. The lift may also include a pivot arm having a first end coupled to the base and a second end pivotally coupled to the frame. As the drive portion drives the linearly movable member along the substantially linear axis the frame moves upwardly and rotates relative to the base. The frame may thus be moved by the vertical lift from a loading position where a container may be loaded onto the frame, e.g., through an open end of the frame, to an unloading position where the container may be unloaded, e.g. from an open top of the frame. Due to the vertical and rotational movement of the frame by the vertical lift, as the frame moves from the loading position to the unloading position the frame remains in a compact envelope space. This allows use of apparatus consistent with the present disclosure at locations where space is limited and/or in a manner that efficiently uses existing space.

Figure 1D:
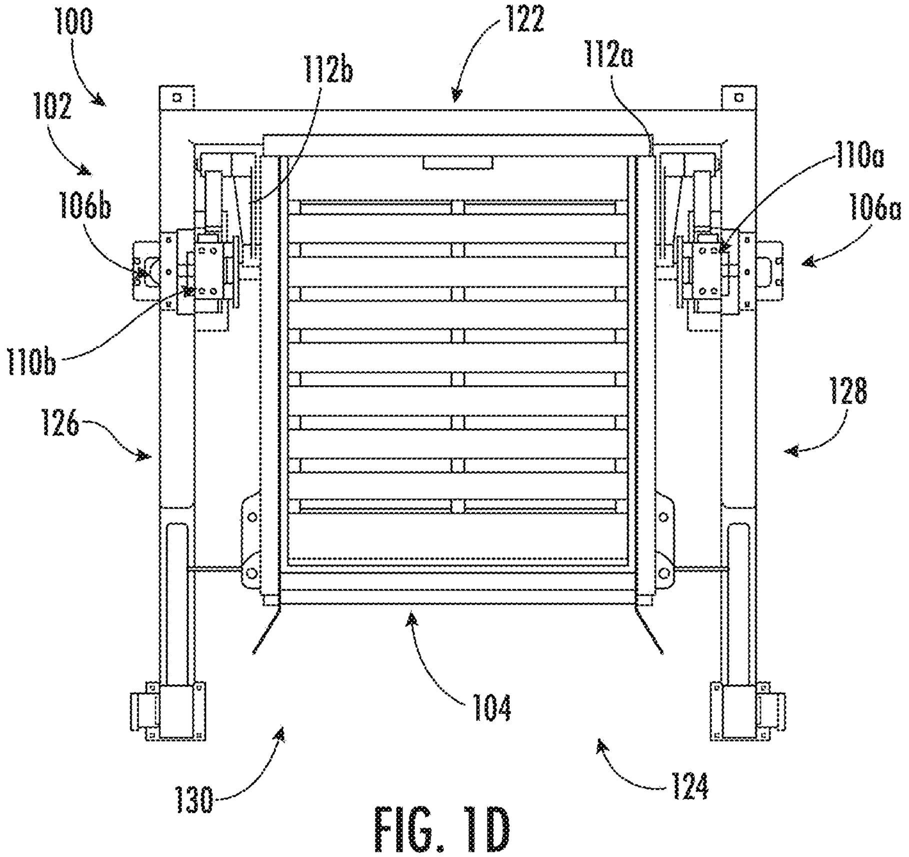
FIG. 1D is a top view of the container loading apparatus shown in FIG. 1A.
Figure 1E:
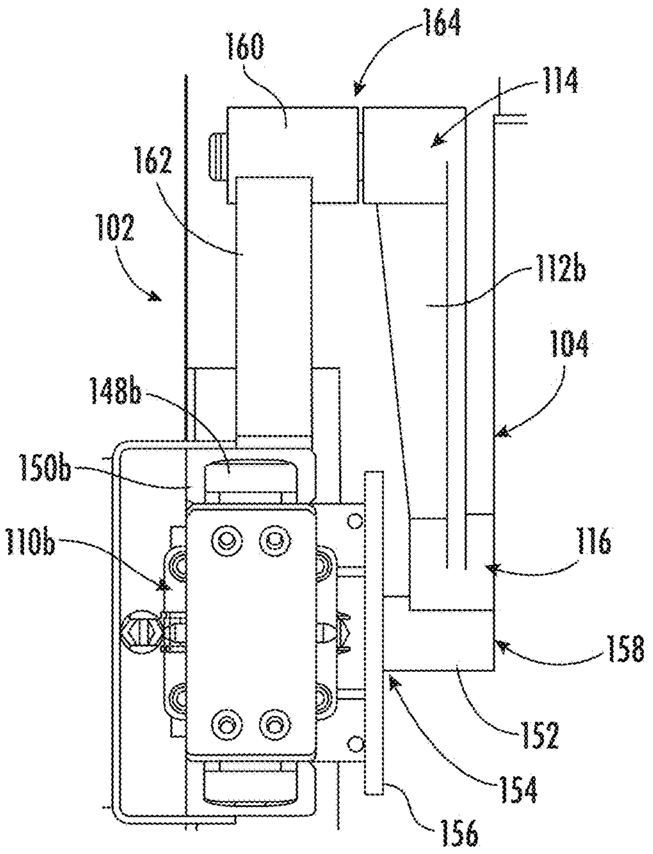
FIG. 1E is close-up view of a portion of the top view the container loading apparatus shown in FIG. 1D.

FIGS. 1A-1H illustrate one example embodiment of 100 consistent with the present disclosure. In general, the illustrated system 100 includes a base 102, a frame 104, and first **106*a* and second 106*b* vertical lifts. Each of the vertical lifts 106*a*, 106*b* includes a drive portion 108*a*, 108*b*, respectively, fixed to the base 102, and a linearly movable member 110*a*, 110*b* pivotally coupled to the frame 104. Each drive portion 108*a*, 108*b* is configured for driving an associated linearly movable member 110*a*, 110*b* for movement along a substantially linear axis A1 relative to the drive portion 108*a*, 108*b* and the base 102. Each vertical lift 106*a*, 106*b* also includes a pivot arm 112*a*, 112*b*. As shown in FIGS. 1D and 1E, each pivot arm 112*a*, 112*b* is a rigid elongate member and has a first end 114 coupled to the base 102 and a second end 116 pivotally coupled to the frame 104**.

In FIGS. 1A-1H the frame 104 is shown in a loading position. As each drive portion **108*a*, 108*b* drives the associated linearly movable member 110*a*, 110*b* along the substantially linear axis A1, the frame 104 moves upwardly and rotates relative to the base 102 to an unloading position, as shown in FIGS. 4A-B. FIGS. 2A-2B, 3A-3B respectively show different positions of the frame 104 as the vertical lifts 106*a*, 106*b* transition the frame 104 from the loading position shown in FIGS. 1A-H to the unloading position shown in FIGS. 4A-4B**.

The base 102 is a rigid structure, e.g., formed from metallic components, with a bottom 118 (FIG. 1C) configured to lay flat on a floor surface 120. The base 102 may be fixedly attached to a portion of the floor surface 120 (i.e., the base 102 may be bolted the floor surface 120). In some embodiments, the base 102 may be removably positioned on the floor surface 120 to allow for portability of the system 100. In the illustrated example embodiment and as shown particularly in FIG. 1D, the base 102 is generally rectangular with a front 122, an open rear 124, and left 126 and right sides 128. The base 102 thus defines a cavity 130 for receiving the frame 104 when the frame 104 is in the loading position.

With reference to FIG. 1A, in the illustrated example embodiment, the frame 104 includes a platform 132 for supporting a container 134, a front 136, an open rear 138, left 140 and right 142 sides, and an open top 144. The frame 104 thus defines a cavity 146 for receiving the container 134 through the open rear end 138 and the container 134 may be supported within the cavity 146 on the platform 134. The front 136 and left 140 and right 142 sides may extend to a height greater than a height of the container 134.

Although specific embodiments of the base 102 and frame 104 are shown in the example embodiments, it will be recognized that the base 102 and the frame 104 may be provided in a variety of configurations. For example, the size, shape and dimensions of the base 102 and the frame 104 may be selected depending on the configuration of the container 134 to be loaded or emptied using the apparatus, the space where the apparatus where the apparatus is to be used, etc. The illustrated example embodiment is thus provided by way of illustration, not of limitation.

The vertical lifts **106*a*, 106*b* may be provided in a variety of configurations. Also, in the illustrated example embodiment, a first vertical lift 106*a* is provided on left side 140 of the frame 104 and a second vertical lift 106*b* is provided on the right side 142 of the frame 104. It is to be understood, however, that an apparatus consistent with the present disclosure need not contain two vertical lifts 106*a*, 106*b* but may include any number of vertical lifts, including only one vertical lift. For simplicity and ease of explanation, the description herein may refer to the configuration and operation of only one of the illustrated vertical lifts, e.g. lift 106*a* or 106*b*. It is to be understood that the other of the illustrated vertical lifts 106*a*, 106*b*** is configured in the same manner.

In the illustrated example embodiment, each of the vertical lifts **106*a*, 106*b* is configured as a linear actuator and the drive portion 108*a*, 108*b* includes an electric motor and the linearly movable member 110*a*, 110*b* is configured as an elongate generally rectangular lift arm 148*a*, 148*b*. The motor is configured, in a known manner, to drive the lift arm 148*a*, 148*b* along the linear axis A1 and relative to the base 102 and the drive portion 108*a*, 108*b*. Each drive portion 108*a*, 108*b* is disposed within, and is coupled to, a lift tower 150*a*, 150*b* that is fixed to the base 102. The lift arm 148*a*, 148*b* is partially disposed within the lift tower 150*a*, 150*b* and extends from a top of the lift tower 150*a*, 150*b* when driven by the drive portion 108*a*, 108*b*. The lift tower 150*a*, 150*b* may be configured to block access to moving portions of the vertical lift 106*a*, 106*b*** to prevent injury to a user.

In other embodiments, one or more of the vertical lifts **106*a*, 106*b* may include a hydraulic or pneumatic piston, and the drive portion 108*a*, 108*b* may be a piston of the hydraulic or pneumatic position and the linearly movable member 110*a*, 110*b* may be a piston rod of the hydraulic or pneumatic position. Also, the vertical lifts 106*a*, 106*b* need not include a lift tower 150*a*, 150*b*. Instead, the drive portion 108*a*, 108*b* of each of the vertical lifts 106*a*, 106*b* may be coupled directly to the base 102**.

With particular reference to FIG. 1E, in the illustrated example embodiment the lift arm **148*b* is coupled to the frame 104 by an extension 152 extending between the lift arm 148*b* and the frame 104. A first end 154 of the extension 152 is fixed to a plate 156, which is fixed to the lift arm 148*b*. A second end 158 of the extension 152 is pivotally coupled to the frame 104 to allow the frame 104 to rotate relative to the lift arm 148*b* and the base 102. As each drive portion 108*a*, 108*b* drives the lift arm 148*b* to move the frame 104 from the loading position to the unloading position, the lift arm 148*a*, 148*b* lifts the frame 104 along the linear axis A1 while the pivotal connection between the lift arm 148*a*, 148*b* and the frame 104 allows the frame 104 to rotate relative to the lift arm 148*a*, 148*b* and the base 102. A variety of configurations for pivotally coupling the linearly movable members 110*a*, 110*b* to the frame 104 are possible. For example, in some embodiments the second end 158 of the extension 152 may be fixed to the frame 104 and the first end 154 of the extension 152 may be pivotally coupled to the lift arm 148*b*, e.g. to the plate 156**.

The pivot arms **112*a*, 112*b* may be coupled between the base 102 and the frame 104 in a variety of configurations. With continued reference to FIG. 1E, in the illustrated embodiment the pivot arm 112*b* is coupled to the base 102 through an extension 160 coupled to a bracket 162 fixed to the lift tower 150*b*. In some embodiments, however, the pivot arm 112*b* may be coupled directly to the lift tower 150*b* or the base 102 without use of an extension or a bracket 162**.

In the illustrated example embodiment, the extension 160 is fixed to the base 102 through the bracket 162, and the first end 114 of the pivot arm **112*b* is pivotally coupled to an end 164 of the extension 160. A second end 116** of the pivot arm

112*b* is pivotally coupled to the frame 104. As each drive portion 108*a*, 108*b* drives the lift arm 148*a*, 148*b* to move the frame 104 from the loading position to the unloading position, the lift arm 148*a*, 148*b* lifts the frame 104 along the linear axis A1 while the pivotal connection between the pivot arms 112*a*, 112*b* and the frame 104 constrains the movement of the frame 104 to cause rotation of the first ends 114 of the pivot arms 112*a*, 112*b* relative to the extension and the base 102 and rotation of frame 104 relative to the second ends 116 of the pivot arms 112*a*, 112*b* and the base 102.

Figure 1F:
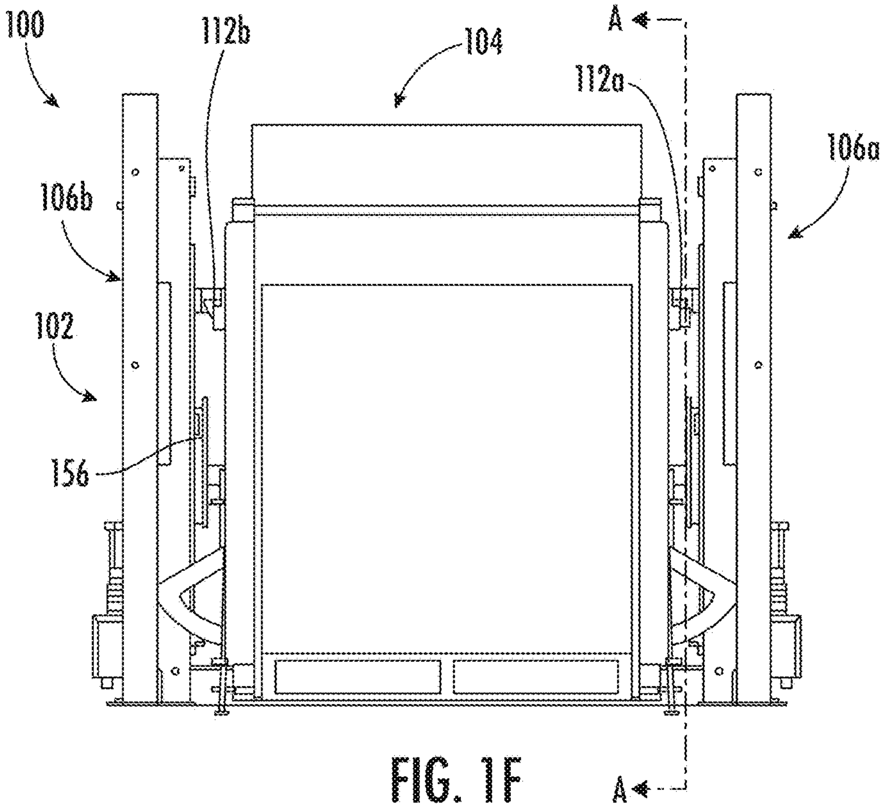
FIG. 1F is a rear view of the container loading apparatus shown in FIG. 1A.
Figure 1G:
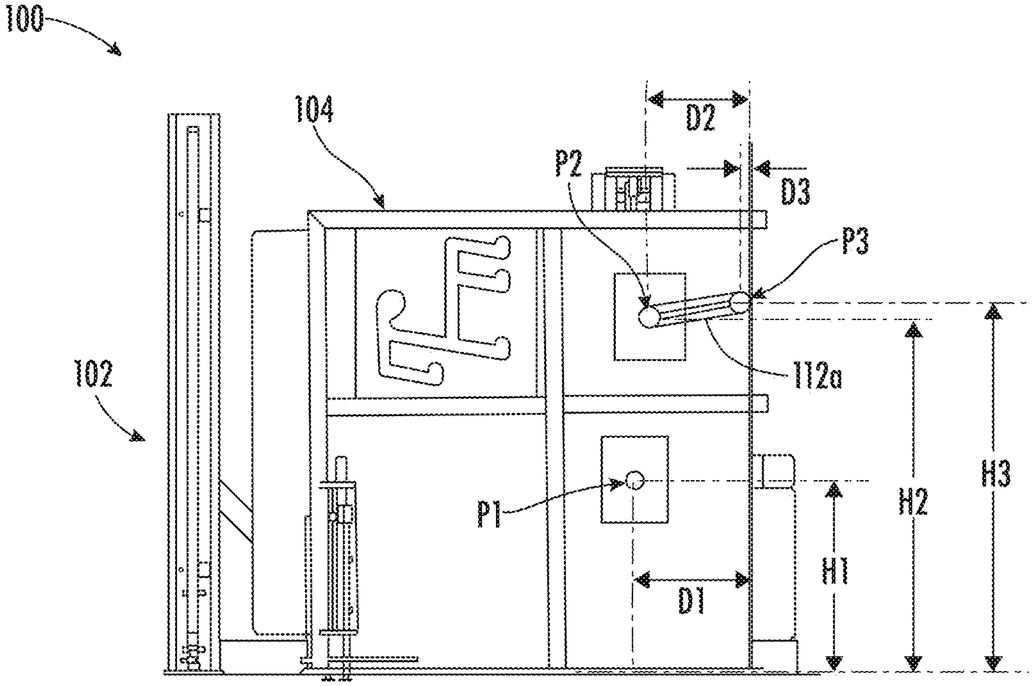
FIG. 1G is a sectional view of the container loading apparatus shown in FIG. 1A taken along the lines A-A shown in FIG. 1F.
Figure 1H:
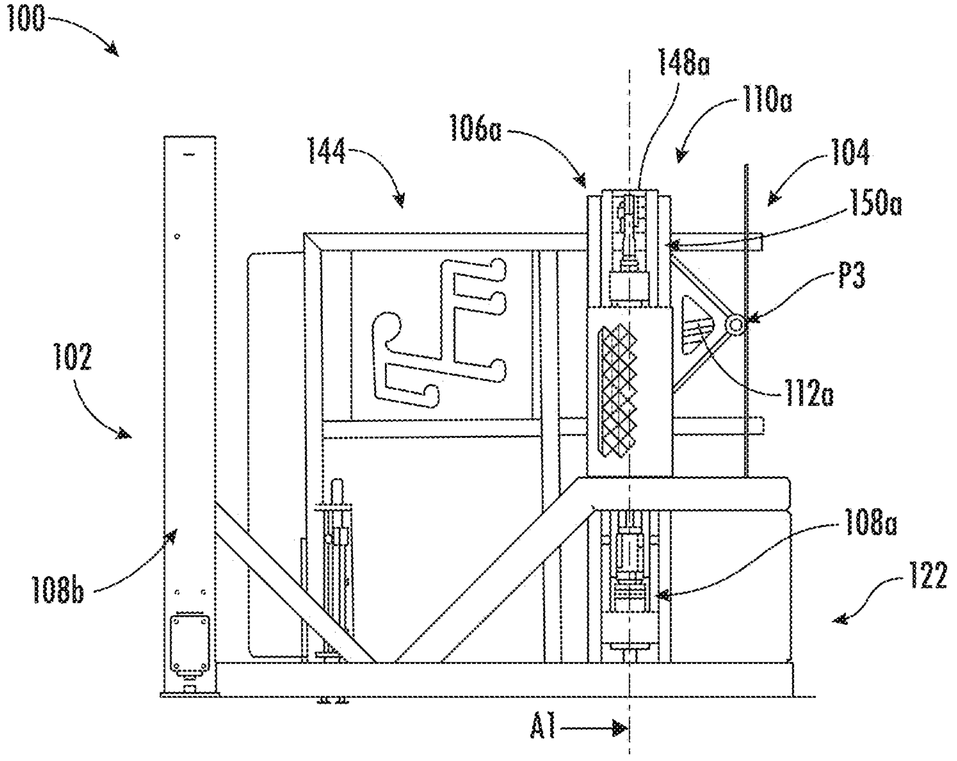
FIG. 1H is a right side view of the container loading apparatus shown in FIG. 1A.

FIG. 1G is a side sectional view taken along the lines A-A in FIG. 1F, and FIG. 1H is a side view of the apparatus 100. In the illustrated example embodiment, the linearly movable member 110*a*, 110*b* is pivotally coupled to the frame 104, e.g. by the extension 152, for rotation about a first pivot point P1, the second end 116 of the lift arm 148*a* is pivotally coupled to the frame 104 for rotation about a second pivot point P2, and the first end 114 of the lift arm 148*a* is coupled to the base 102, e.g. by the extension 160 and bracket 162, for rotation about a third pivot point P3.

The positions of the pivot points P1, P2, P3 on the frame 104 may be varied depending on the desired motion of the frame 104 when moving between the loading and unloading positions. In the illustrated example embodiment, the first pivot point P1 is positioned at a linear distance D1 from the front 136 of the frame 104 and at height H1 from the bottom of the frame 104. The second pivot point is positioned at a linear distance D2 from the front 136 of the frame 104 and at a height H2 from the bottom of the frame 104. The third pivot point is positioned at a linear distance D3 from the front 136 of the frame 104 and at a height H3 from the bottom of the frame 104. In the illustrated example embodiment, the distance D1 is greater than the distance D2, which is greater than D3, i.e. D1>D2>D3. Also, height H3 is greater than the H2, which is greater than the height H1, i.e. H3>H3>H1. With this configuration the vertical lifts 106*a*, 106*b* may lift the frame 104 vertically while the pivot arms 112*a*, 112*b* cause forward rotation of the frame 104 to empty contents of the container 134 from the open top 144 of the frame 104. In some embodiments, the relative positions of the first P1, second P2 and/or third P3 pivot points may be modified to cause a different motion of the frame 104 relative to the base 102.

Figure 2A:
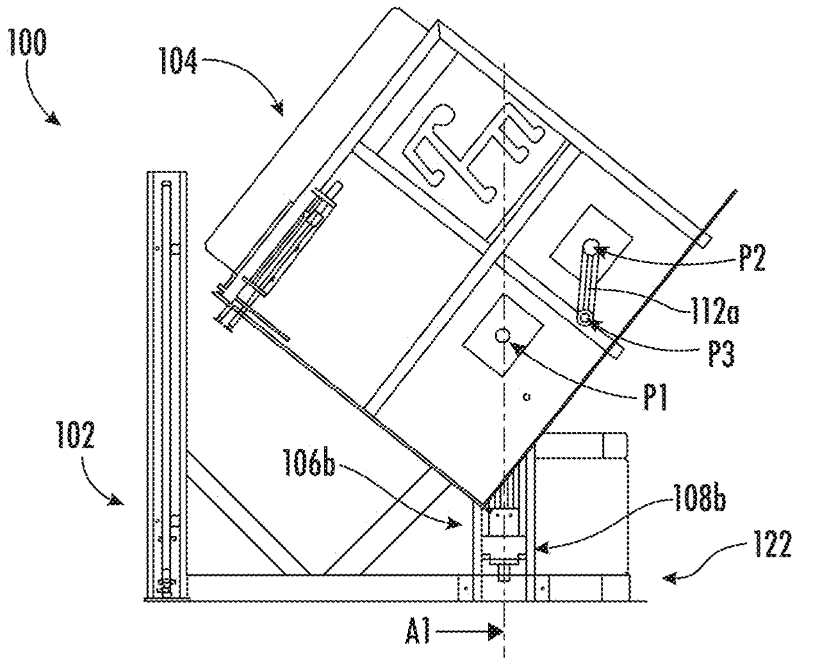
FIG. 2A is a sectional view of the container loading apparatus shown in FIG. 1A taken along the lines A-A shown in FIG. 1F but with the apparatus transitioning to an unloading position.
Figure 2B:
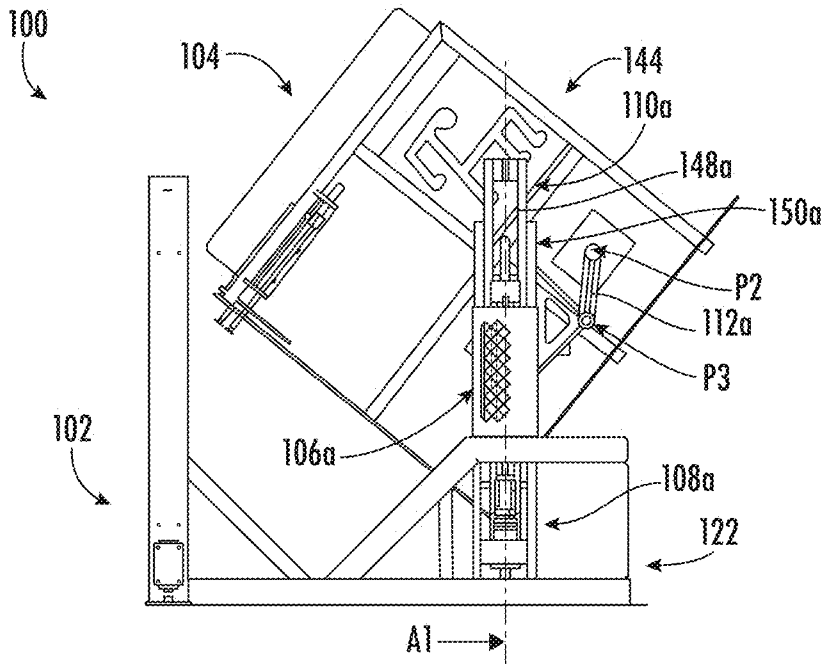
FIG. 2B is a right side view of the container loading apparatus in the position shown in FIG. 2A.

FIG. 2A is a side sectional view taken along the lines A-A in FIG. 1F, but when the frame 104 is an intermediate position during transition from the loading position shown in FIG. 1F to the unloading position shown in FIGS. 4A and 4B. FIG. 2B is a side view of the apparatus 100 in the intermediate position shown in FIG. 2A. In the illustrated position the vertical lifts 106*a*, 106*b* have moved the frame 104 vertically along the linear axis A1 from the position shown in FIG. 1G and the frame 104 has rotated forwardly, i.e. toward the front 122 of the base 102, about the first pivot point P1. Also, the frame 104 has rotated forwardly about the second pivot point P2 and the pivot arm 112*a* has rotated forwardly about the third pivot point P3. The frame 104 has thus been lifted and forwardly rotated by about 45 degrees.

Figure 3A:
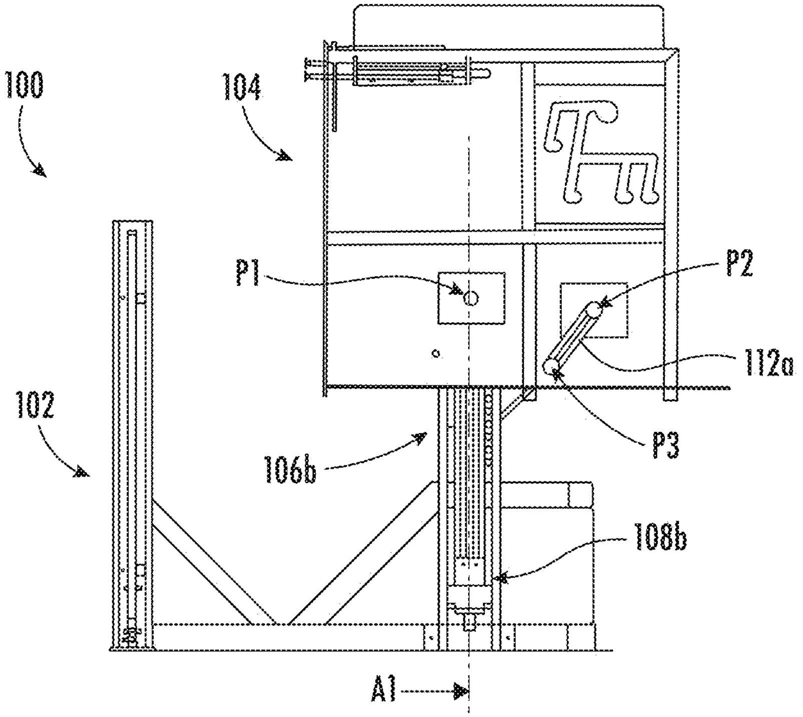
FIG. 3A is a sectional view of the container loading apparatus shown in FIG. 1A taken along the lines A-A shown in FIG. 1F but with the apparatus transitioning to an unloading position.
Figure 3B:
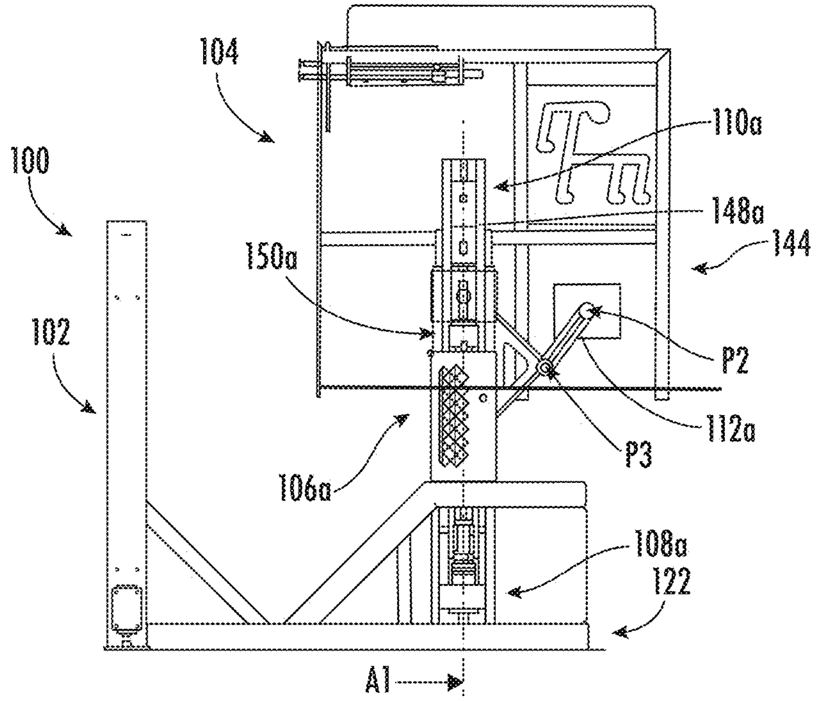
FIG. 3B is a right side view of the container loading apparatus in the position shown in FIG. 3A.
Figure 4A:
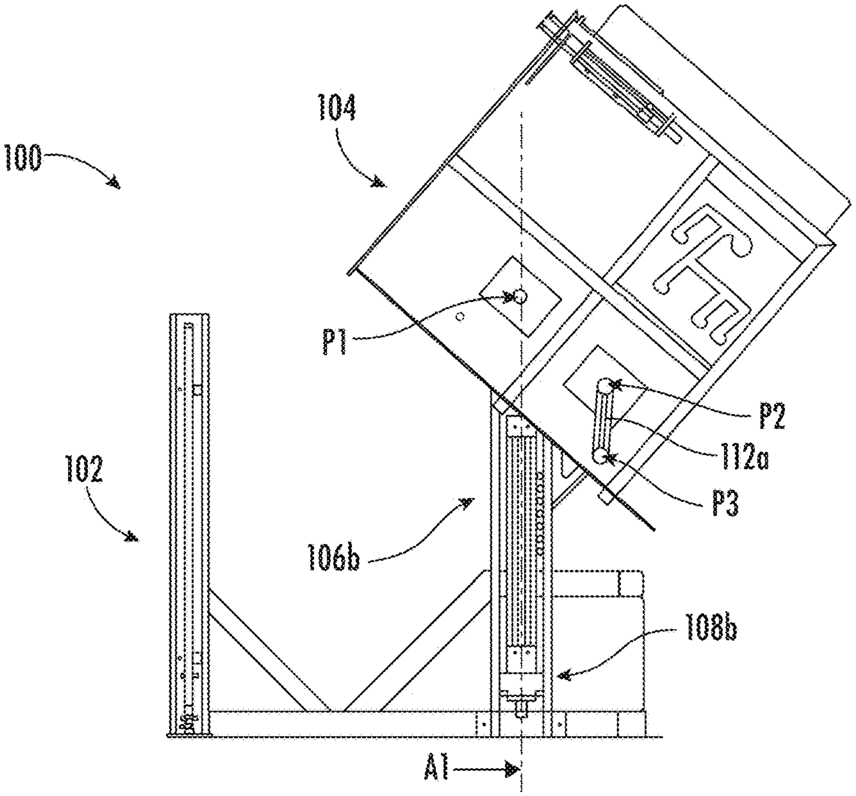
FIG. 4A is a sectional view of the container loading apparatus shown in FIG. 1A taken along the lines A-A shown in FIG. 1F but with the apparatus in an unloading position.
Figure 4B:
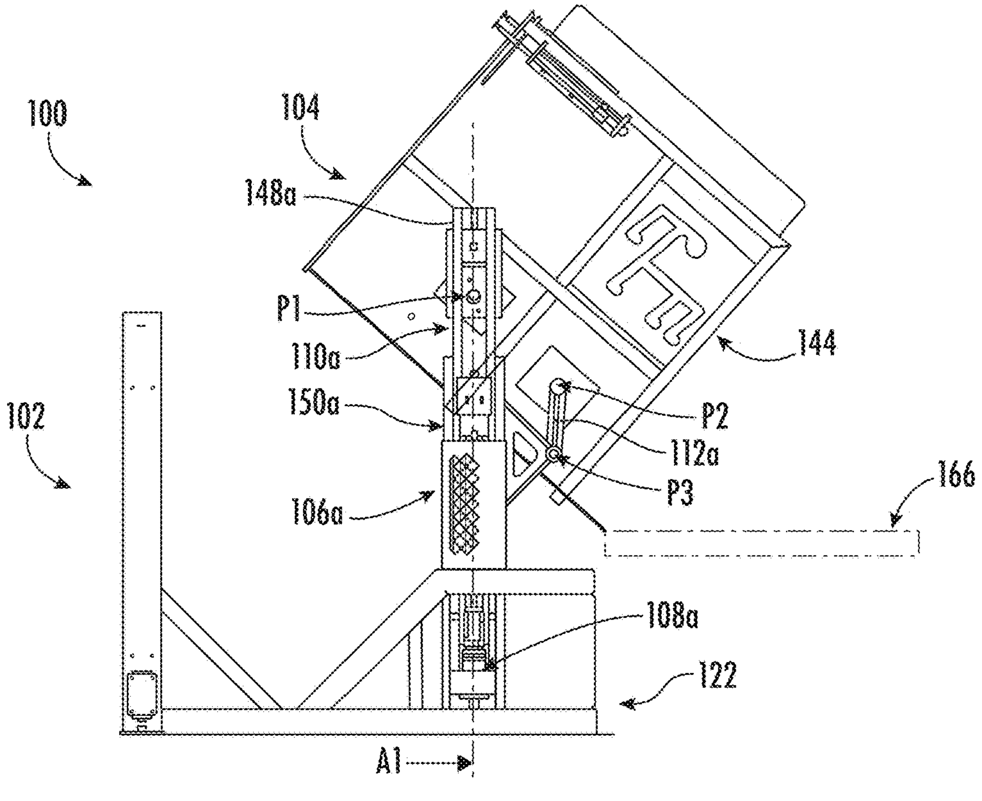
FIG. 4B is a right side view of the container loading apparatus in the unloading position shown in FIG. 4A.

FIG. 3A is a side sectional view taken along the lines A-A in FIG. 1F, but when the frame 104 is in a further intermediate position during transition from the loading position shown in FIG. 1F to the unloading position shown in FIGS. 4A and 4B. FIG. 3B is a side view of the apparatus 100 in the intermediate position shown in FIG. 3A. In the illustrated position, and compared to FIG. 2A, the vertical lifts 106*a*, 106*b*, have moved the frame 104 vertically along the linear axis A1 from the position shown in FIG. 2A and the frame 104 has further rotated about the first pivot point P1. Also, the frame 104 has rotated forwardly about the second pivot point P2 and the pivot arm 112*a* has rotated forwardly about the third pivot point P3. The frame 104 has thus been lifted and forwardly rotated by about 90 degrees.

FIG. 4A is a side sectional view taken along the lines A-A in FIG. 1F, but when the frame 104 is in the unloading position. FIG. 4B is a side view of the apparatus in the unloading position shown in FIG. 4A. In the illustrated position, and compared to FIG. 3A, the vertical lifts 106*a*, 106*b* have moved the frame 104 vertically along the linear axis A1 and the frame 104 has further rotated about the first pivot point P1. Also, the frame 104 has rotated forwardly about the second pivot point P2 and the pivot arm 112*a* has rotated rearwardly about the third pivot point P3. The frame 104 has thus been lifted and forwardly rotated by about 135 degrees. In this unloading position, the open top 144 of the frame 104 is downwardly oriented to allow the contents of a container 134 to empty from the open top 144 of the frame 104 and, for example, onto a receptacle 166 such as a platform, a conveyor or receiving container.

Transition of the frame 104 from the unloading position shown in FIGS. 4A-4B back to the loading position shown in FIGS. 1A-1H may proceed in a reverse order from that described above. A controller 168 (FIG. 1) may be coupled to the system 100 through a wired or wireless connection to provide control signals for energizing the drive portions 108*a*, 108*b* associated with each of the vertical lifts 106*a*, 106*b* to cause the vertical lifts 106*a*, 106*b* to move the frame 104 between the loading and unloading positions. The controller 168 may provide the control signals to the system 100 autonomously, or in response, at least in part, to operator input.

Figure 5:
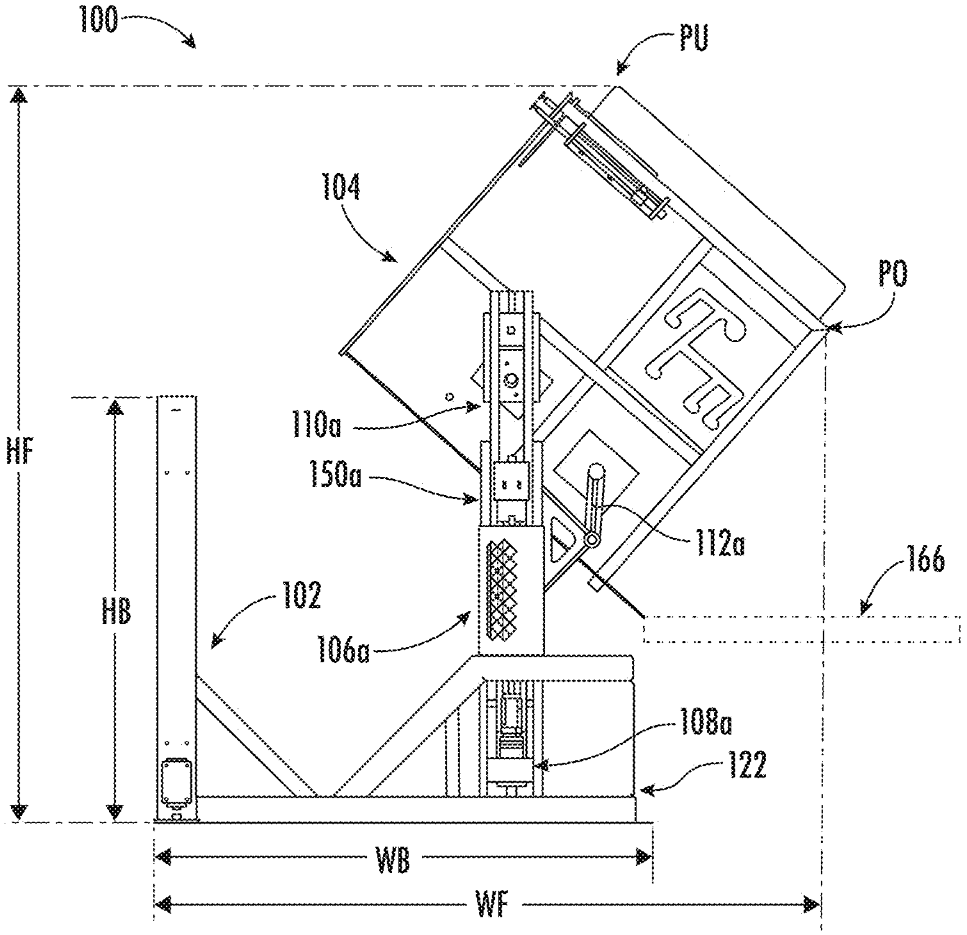
FIG. 5 is a right side view of the container loading apparatus in the unloading position showing a maximum envelope space of movement for the example embodiment shown in FIG. 1A.

Advantageously, due to the vertical and rotational movement of the frame 104 as the frame 104 moves from the loading position to the unloading position the frame 104 remains in a compact envelope space. FIG. 5 illustrates one example of the envelope space associated with the apparatus shown in FIGS. 1A-4B. It is to be understood, however, that the specific envelope space in any embodiment consistent with the present invention depends on the size of the apparatus, e.g. the size of the base 102 and the frame 104. Also, the envelop space may be selectively modified in embodiments consistent with the present disclosure by modifying the position of first pivot point P1, second pivot point P3 and/or the third pivot point P3.

In the embodiment shown in FIG. 5, the base 102 has a width WB from the rear of the base 102 to the front of the base and a height HB from the bottom of the base 102 within which the frame 104 is contained when the frame 104 is in the loading position as shown in FIGS. 1A-1H. When the frame 104 is moved to the unloading position, the outermost point P0 of the frame 104 is at a width WF from the rear of the base 102 and the uppermost point PU of the frame 104 is positioned at a height HF from the bottom of the frame 104. In some embodiments, the height HF may be less than about 190% of the height HB of the base 102 and the width WF may be less than about 150% of the width WB of the base 102. In one embodiment consistent with the present disclosure, the width WB may be about 77.5 inches, the width WF may be about 104.625 inches, the height HB may be about 66.5625 inches, the height HF may be about 114.625. In some embodiments, therefore, the height HF may thus be about 172% of the height HB of the base 102 and the width WF may be about 135% of a width WB of the base 102.

A container unloading apparatus consistent with the present disclosure may be provided in a variety of configurations. FIGS. 6-10, for example, illustrate another example embodiment 100*a* of a container unloading apparatus consistent with the present disclosure.

In general, the illustrated apparatus 100*a* includes a base 102*a*, a frame 104*a*, and first 106*a* and second 106*b* vertical lifts. Each of the vertical lifts 106*a*, 106*b* includes a drive portion fixed to the base 102*a*, and a linearly movable member 110*a*, 110*b* pivotally coupled to the frame 104*a*. Each drive portion is configured for driving an associated linearly movable member 110*a*, 110*b* for movement along a substantially linear axis relative to the drive portion and the base 102*a*. Each vertical lift 106*a*, 106*b* also includes a pivot arm 112*a*, 112*b*. Each pivot arm 112*a*, 112*b* is a rigid elongate member and has a first end 114 coupled to the base 102*a*, e.g. through the bracket 162, and a second end 116 pivotally coupled to the frame 104*a*.

Figure 6:
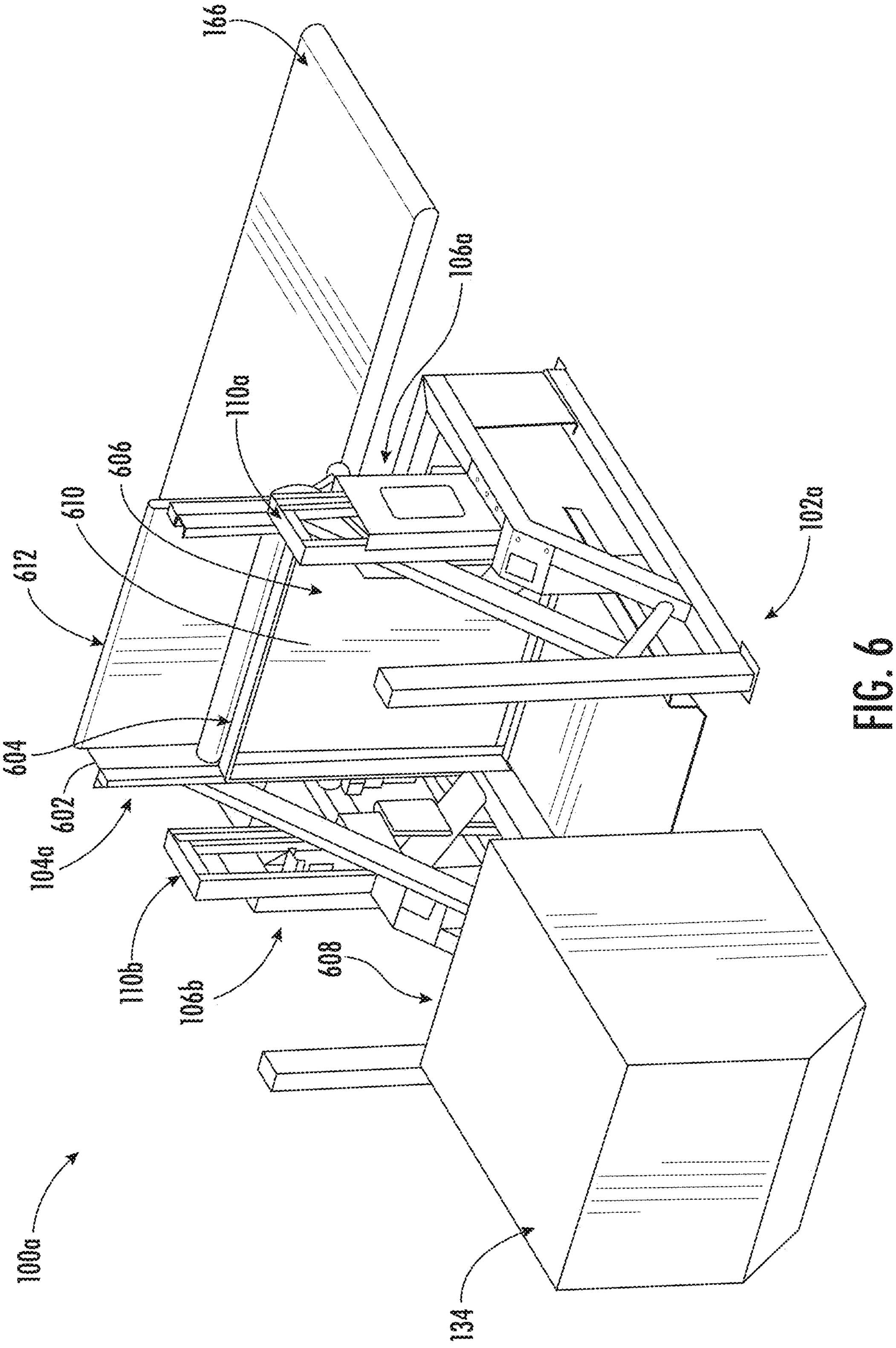
FIG. 6 is a right rear isometric view of one example embodiment of a container unloading apparatus consistent with the present disclosure wherein the apparatus is in a loading position.
Figure 7:
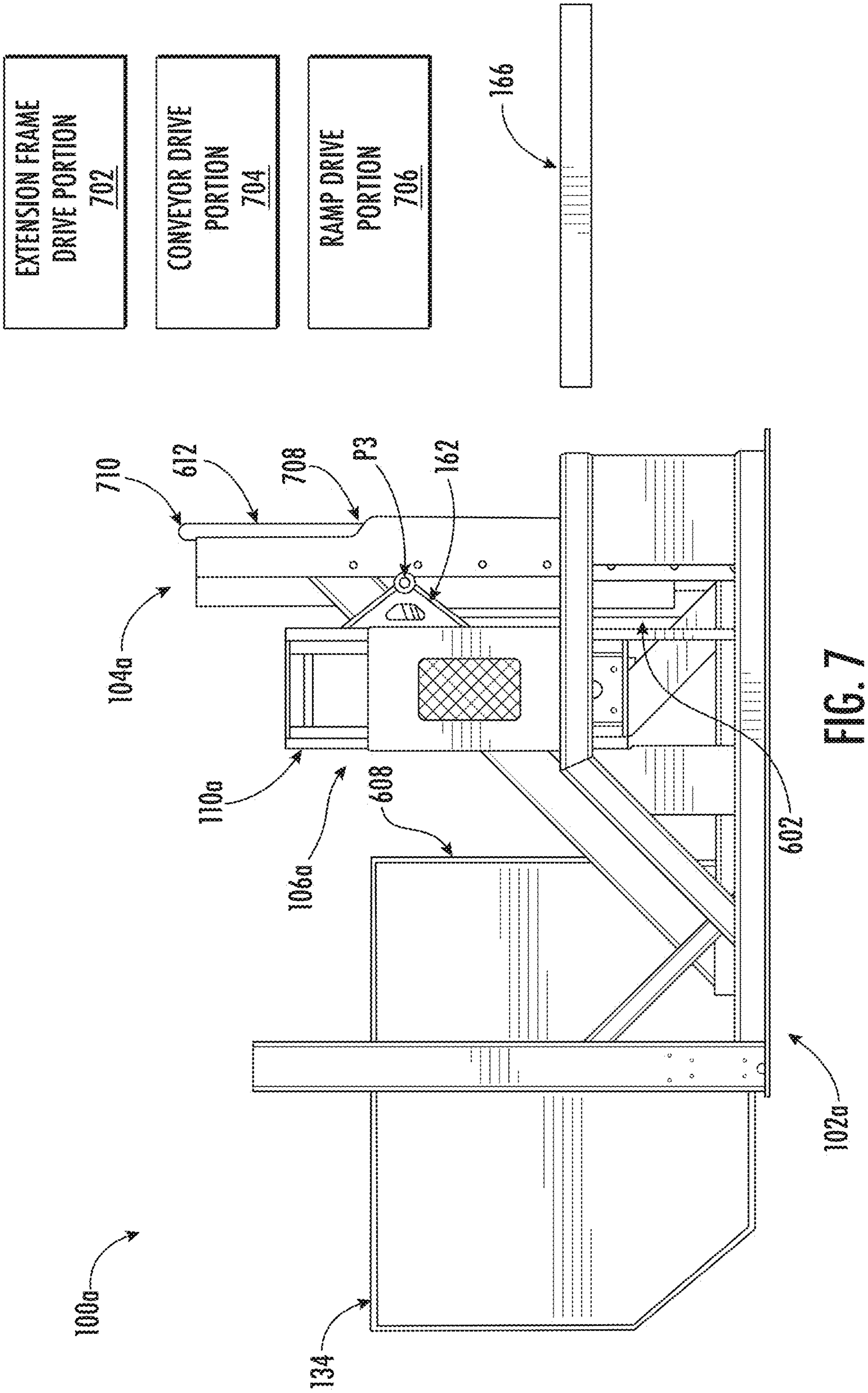
FIG. 7 is a right side view of the container loading apparatus shown in FIG. 6.
Figure 8:
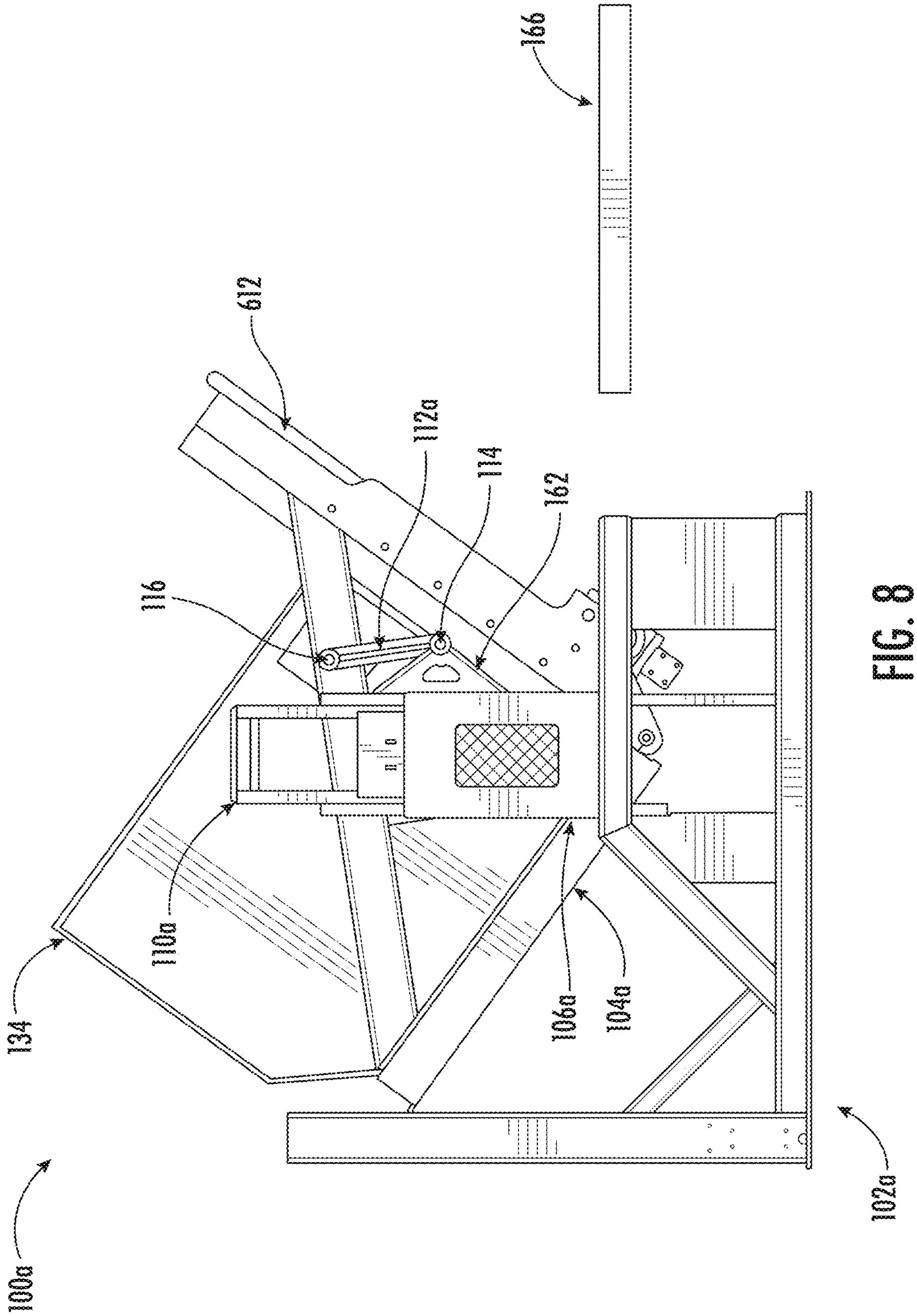
FIG. 8 is a right side view of the container loading apparatus shown in FIG. 6 with the apparatus transitioning to an unloading position.
Figure 9:
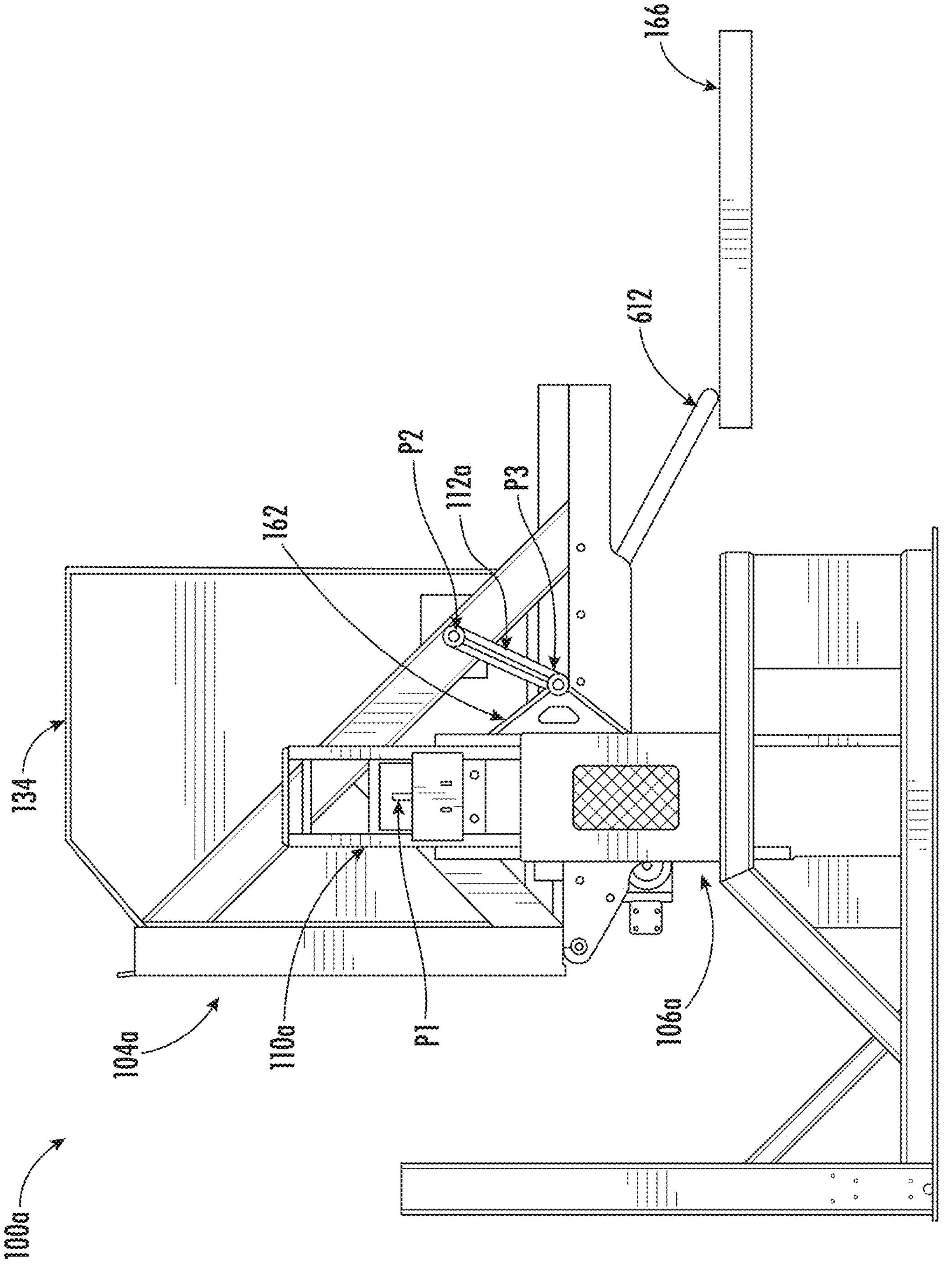
FIG. 9 is a right side view of the container loading apparatus shown in FIG. 6 with the apparatus transitioning to an unloading position.
Figure 10:
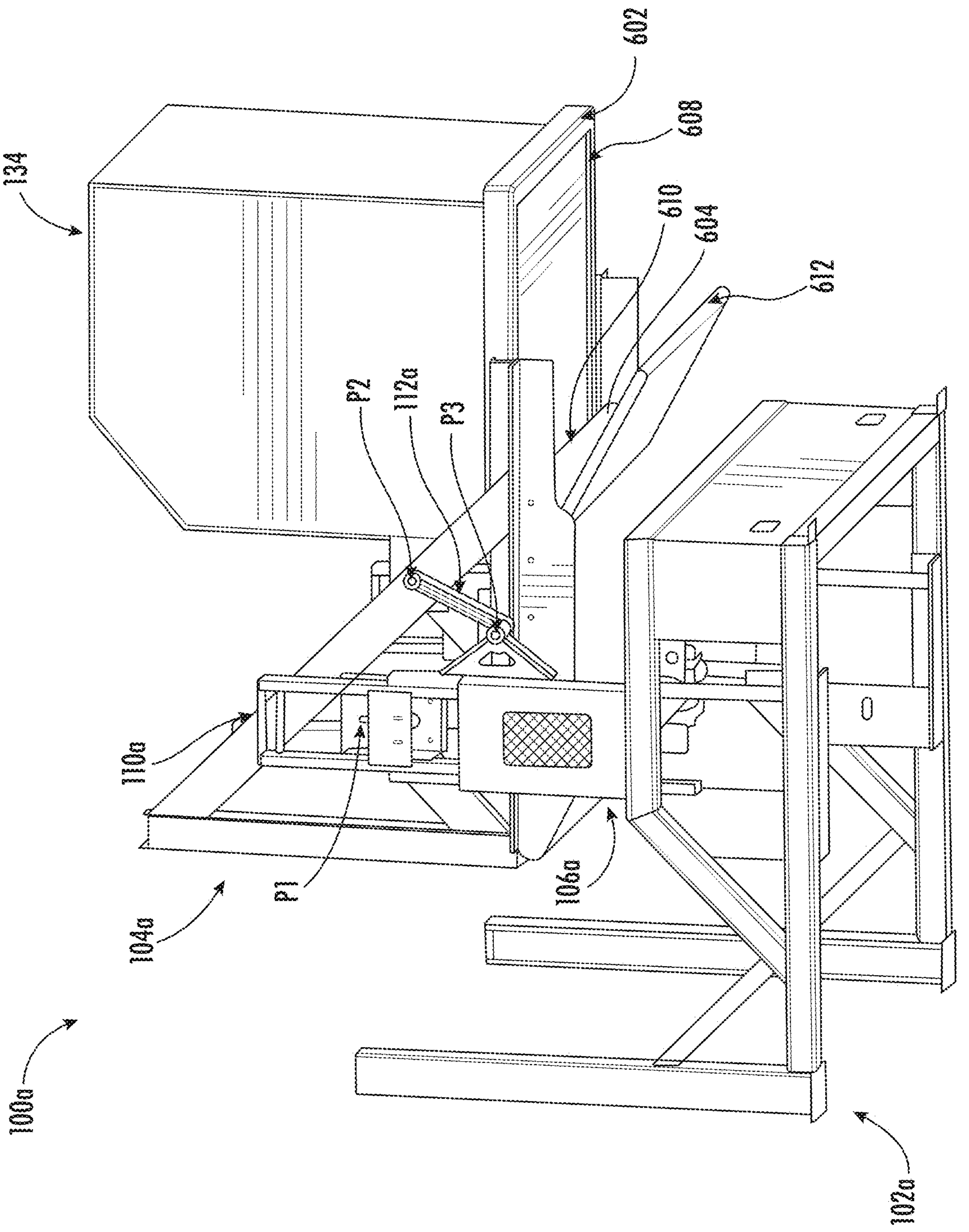
FIG. 10 is a right side view of the container loading apparatus shown in FIG. 6 with the apparatus in an unloading position.

In FIGS. 6 and 7 the frame 104*a* is shown in a loading position. As each drive portion drives the associated linearly movable member 110*a*, 110*b* along the substantially linear axis, the frame 104*a* moves upwardly and rotates relative to the base 102*a* to an unloading position, as shown in FIG. 10. FIGS. 8 and 9 respectively show different positions of the frame 104*a* as the vertical lifts 106*a*, 106*b* transition the frame 104*a* from the loading position shown in FIGS. 6 and 7 to the unloading position shown in FIG. 10.

The base 102*a*, the frame 104*a*, the first 106*a* and second 106*b* vertical lifts, the linear moveable members 110*a*, 110*b*, the drive portions, and the pivot arms 112*a*, 112*b* of the apparatus 100*a* are coupled and operate to move the frame 104*a* about pivot points P1, P2 and P3, as described above in connection with the apparatus 100, which will not be repeated for ease of explanation. In the illustrated example embodiment, the unloading position is reached when the frame 104*a* has been rotated to substantially 90 degrees from the loading position, as shown in FIG. 10, and also in FIGS. 3A and 3B with respect to the apparatus 100.

The apparatus 100*a* also includes an extension frame 602, a conveyor 604, and a ramp 612. The extension frame 602 has rigid sides defining a central opening 606 between the rigid sides. In general, the sides of the extension frame 602 are sized to receive the container 134 with at least a portion of the perimeter of the container 134 positioned adjacent shelf portions of the sides of the extension frame 602 at the front of the extension frame 602. The central opening 606 of the extension frame 602 may thus be positioned adjacent the open end 608 of the container 134. In some embodiments, the extension frame 602 may have fixed dimensions corresponding to the dimensions of the container 134. In some embodiments, the extension frame 602 may have adjustable dimensions to allow adjustment of the extension frame 602 for use with containers 134 of different dimensions. The rear of the extension frame 602 is positioned adjacent the conveyor 604, such that the extension frame 602 is positioned between a top surface 610 of the conveyor 604 the open end 608 of the container 134.

The extension frame 602 may be slidably movable with respect to the conveyor 604 and the remainder of the frame 104*a* and may be coupled to an extension frame drive portion 702 for driving the extension frame 602 and the container 134 between a non-extended position relative to the remainder of the frame 104*a*, shown in FIGS. 6-9, and an extended position shown in FIG. 10 relative to the remainder of the frame 104*a*. In the non-extended position shown in FIGS. 6-9, the central opening 606 of the extension frame 602 and the open end 608 of the container 134 are aligned adjacent to the conveyor 604. In the extended position shown in FIG. 10, the extension frame 602 and the container 134 are extended forwardly with respect to the frame 104*a*, the conveyor 604 and the base 102*a* to allow emptying of the contents of the container 134. The conveyor 604 may be coupled to a conveyor drive portion 704 for driving the conveyor 604 for rotational movement about a conveyor frame. The extension frame drive portion 702 and the conveyor drive portion 704 may be known, hydraulic, electric and/or pneumatic drive systems, e.g., pistons and/or motors.

The ramp 612 has a bottom end 708 pivotally coupled to the frame 104*a* and extends upwardly on the frame 104*a* relative to the conveyor 602 when the apparatus 100*a* is in a loading position. A top end 710 of the ramp 612 is not connected to the frame 104*a*. A ramp drive portion 706 causes the ramp 612 to pivot relative to the frame 104*a* at the bottom end 708 of the ramp 612, causing the top end 710 of the ramp 612 to pivot away from the frame 104*a* (as shown for example in FIGS. 9 and 10). The ramp drive portion 706 may be a known, hydraulic, electric and/or pneumatic drive system, e.g., pistons and/or motors.

With reference to FIGS. 8 and 9, as the apparatus 100*a* moves the frame 104*a* to the unloading position shown in FIG. 10, the open end 608 of the container 134 is supported by the extension frame 602 with the contents of the container 134 passing through the open end 608 of the container 134 and the central opening 606 in the extension frame 602 to rest on the top surface 610 of the conveyor 604. The extension frame drive portion 702 then drives the extension frame 602 and the container 134 supported thereon toward the extended position, the conveyor drive portion 704 drives the conveyor 604 to rotate, and the ramp drive portion 706 rotates the ramp 612 around the bottom end 708 of the ramp 612.

The container 134 remains supported on the extension frame 602 with the open end 608 of the container 134 aligned with the central opening 606 of the extension frame 602 when the extension frame 602 and the container 134 are in the extended position. The contents of the container 134 thus fall from the container 134 and are guided onto a receptacle 166 by the ramp 612 and/or are conveyed by the conveyor 604 onto the ramp 612, which guides them onto the receptacle 166. In some embodiments, the rotational speed of the conveyor 604 may be substantially the same as the speed at which the extension frame 602 is driven from the non-extended position to the extended position to resist shearing of the contents of the container 134. Advantageously, the frame 104*a* remains in a compact envelope space as the frame 104*a* moves from the loading position to the unloading position, as described above in connection with FIG. 5.

Consistent with one aspect of the present disclosure there is provided an apparatus for emptying the contents of a container including: a base; a frame; and a lift. The lift includes a drive portion fixed to the base, a linearly movable member pivotally coupled to the frame, the drive portion configured for driving the linearly movable member for movement relative to the base along a substantially linear axis, and a pivot arm having a first end coupled to the base and a second end pivotally coupled to the frame. As the drive portion drives the linearly movable member along the substantially linear axis the frame moves upwardly and rotates relative to the base to transition from a loading position to an unloading position.

Consistent with another aspect of the present disclosure there is provided an apparatus for emptying the contents of a container including: a base; a frame; and a lift. The lift includes a drive portion fixed to the base, a linearly movable member pivotally coupled to the frame at a first pivot point, the drive portion configured for driving the linearly movable member for movement relative to the base along a substantially linear axis, and a pivot arm having a first end coupled to the base at a third pivot point and a second end pivotally coupled to the frame at a second pivot point. As the drive portion drives the linearly movable member along the substantially linear axis the frame moves upwardly and rotates relative to the base to transition from a loading position to an unloading position. When the frame is in the loading position the first pivot point is positioned at a first linear distance, D1, from a front of the frame and at a first height, H1, from a bottom of the frame, the second pivot point is positioned a second linear distance, D2, from the front of the frame and at a second height, H2 from the bottom of the frame, and the third pivot point is positioned at a third linear distance, D3, from the front of the frame and a third height, H3 from the bottom of the frame, wherein $D1>D2>D3$ and $H1<H2<H3$. As the frame moves from the loading position to the unloading position, the frame remains in an envelope space having a height less than 190% of a height of the base and a width less than 150% of a width the base.

In some embodiments the frame of the apparatus may include an extension frame slidably movable between a non-extended position and an extended position. In some embodiments, the frame may further include a conveyor positioned adjacent the extension frame.

Consistent with another aspect of the disclosure, there is provided an apparatus for emptying the contents of a container a base; a frame comprising an extension frame slidably movable between a non-extended position and an extended position; and a lift coupled to the frame for moving the frame between a loading position and an unloading position. In some embodiments, the apparatus may further include a conveyor positioned adjacent the extension frame. The conveyor is optional and may not be included in some embodiments.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. The phrase "at least one of A and B" should be understood to mean "only A, only B, or both A and B."

Spatially relative terms, such as "beneath," below," upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer, or section could be termed a second element, component, region, layer, or section without departing from the scope and teachings of the present invention.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed:

1. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the linearly movable member is pivotally coupled to the frame by an extension extending between the linearly movable member and the frame, a first end of the extension being fixed to the linearly movable member and a second end of the extension being pivotally coupled to the frame.

2. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the first end of the pivot arm is pivotally coupled to the base, wherein motion of the frame is generated by the drive portion actively driving the linearly movable member along the substantially linear axis, and wherein the pivot arm constrains a rotational path of the frame as the linearly movable member moves along the substantially linear axis.

3. The apparatus of claim 2, wherein the frame comprises a platform for supporting a container and an open end for receiving a container on the support.

4. The apparatus of claim 2, wherein the linearly movable member is constrained to move along the substantially linear axis by a lift tower fixed to the base.

5. The apparatus of claim 2, wherein the lift comprises a hydraulic cylinder and the drive portion is a hydraulic piston and the linearly movable member is a piston rod of the hydraulic cylinder.

6. The apparatus of claim 2, wherein the lift comprises a pneumatic cylinder and the drive portion is a pneumatic piston and the linearly movable member is a piston rod of the pneumatic cylinder.

7. The apparatus of claim 2, wherein the frame has an open rear end for receiving a container in the loading position of the frame and an open top for emptying the container in the unloading position of the frame.

8. The apparatus of claim 2, wherein as the frame moves from the loading position to the unloading position, the frame remains in an envelope space having a height less than 190% of a height of the base and a width less than 150% of a width of the base.

9. The apparatus of claim 8, wherein the envelope space has a height of about 172% of a height of the base and a width of about 135% of a width of the base.

10. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the pivot arm is coupled to the base by an extension, a first end of the extension being fixed to the base and a second end of the extension being pivotally coupled to the first end of the pivot arm.

11. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the drive portion is disposed in a lift column and the pivot arm is coupled to a bracket extending from a side of the lift column.

12. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the pivot arm is coupled to the bracket by an extension, the extension having a first end fixed to the bracket and a second end pivotally coupled to the first end of the pivot arm.

13. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the linearly movable member is pivotally coupled to the frame at a first pivot point, the second end of the pivot arm is pivotally coupled to the frame at a second pivot point, and the first end of the pivot arm is pivotally coupled to the base at a third pivot point.

14. The apparatus of claim 13, wherein when the frame is in the loading position the first pivot point is positioned at a first linear distance, D1, from a front of the frame and at a first height, H1, from a bottom of the frame, and wherein the second pivot point is positioned at a second linear distance, D2, from the front of the frame and a second height, H2, from the bottom of the frame, and wherein D1>D2 and H1<H2.

15. The apparatus of claim 14, wherein the third pivot point is positioned at a third linear distance, D3, from a front of the frame and at a third height, H3, from a bottom of the frame, and wherein D1>D2>D3 and H1<H2<H3.

16. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, wherein the linearly movable member is constrained to move along the substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the frame comprises an extension frame supporting the container, the container being slidably movable with the extension frame between a non-extended position and an extended position, wherein the extension frame remains positioned to support the container as the extension frame moves between the non-extended position and the extended position.

17. The apparatus according to claim 16, wherein the frame further comprises a conveyor positioned adjacent the extension frame.

18. The apparatus according to claim 16, the apparatus further comprising a ramp pivotally coupled to the frame adjacent the conveyor.

19. An apparatus for emptying the contents of a container comprising:

a base;

a frame; and a lift comprising:

a drive portion fixed to the base, a linearly movable member pivotally coupled to the frame at a first pivot point, the drive portion configured for driving the linearly movable member for movement relative to the base along a substantially linear axis, and a pivot arm having a first end coupled to the base at a third pivot point and a second end pivotally coupled to the frame at a second pivot point, whereby as the drive portion drives the linearly movable member along the substantially linear axis the frame moves upwardly and rotates relative to the base to transition from a loading position to an unloading position, wherein when the frame is in the loading position the first pivot point is positioned at a first linear distance, D1, from a front of the frame and at a first height, H1, from a bottom of the frame, the second pivot point is positioned a second linear distance, D2, from the front of the frame and at a second height, H2 from the bottom of the frame, and the third pivot point is positioned at a third linear distance, D3, from the front of the frame and a third height, H3 from the bottom of the frame, and wherein D1>D2>D3 and H1<H2<H3, and wherein as the frame moves from the loading position to the unloading position, the frame remains in an envelope space having a height less than 190% of a height of the base and a width less than 150% of a width the base.

20. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the linearly movable member is pivotally coupled to the frame by an extension extending between the linearly movable member and the frame, a first end of the extension being fixed to the linearly movable member and a second end of the extension being pivotally coupled to the frame.

21. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the pivot arm is coupled to the base by an extension, a first end of the extension being fixed to the base and a second end of the extension being pivotally coupled to the first end of the pivot arm.

22. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the drive portion is disposed in a lift column and the pivot arm is coupled to a bracket extending from a side of the lift column.

23. The apparatus of claim 22, wherein the pivot arm is coupled to the bracket by an extension, the extension having a first end fixed to the bracket and a second end pivotally coupled to the first end of the pivot arm.

24. An apparatus for emptying the contents of a container comprising:

a base;

a frame; and a lift comprising:

a drive portion fixed to the base, a linearly movable member pivotally coupled to the frame, the drive portion configured for driving the linearly movable member for movement relative to the base along a substantially linear axis, and a pivot arm having a first end coupled to the base and a second end pivotally coupled to the frame, whereby as the drive portion drives the linearly movable member along the substantially linear axis the frame moves upwardly and rotates relative to the base to transition from a loading position to an unloading position, wherein the linearly movable member is pivotally coupled to the frame at a first pivot point, the second end of the pivot arm is pivotally coupled to the frame at a second pivot point, and the first end of the pivot arm is pivotally coupled to the base at a third pivot point.

25. The apparatus of claim 24, wherein when the frame is in the loading position the first pivot point is positioned at a first linear distance, D1, from a front of the frame and at a first height, H1, from a bottom of the frame, and wherein the second pivot point is positioned at a second linear distance, D2, from the front of the frame and a second height, H2, from the bottom of the frame, and wherein $D1>D2$ and $H1<H2$.

26. The apparatus of claim 25, wherein the third pivot point is positioned at a third linear distance, D3, from a front of the frame and at a third height, H3, from a bottom of the frame, and wherein $D1>D2>D3$ and $H1<H2<H3$.

* * * * *